UNITED STATES PATENT OFFICE.

KARL KAUTZSCH, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

COMPOUND OF SILVER GLYCOCHOLATE READILY SOLUBLE IN WATER AND PROCESS OF MAKING SAME.

1,161,867. Specification of Letters Patent. Patented Nov. 30, 1915.

No Drawing. Application filed January 30, 1915. Serial No. 5,214.

*To all whom it may concern:*

Be it known that I, KARL KAUTZSCH, Ph. D., chemist, a citizen of the Empire of Germany, residing at Höchst-on-the-Main, Germany, have invented certain new and useful Improvements in a New Compound of Silver Glycocholate Readily Soluble in Water and Process of Making Same, of which the following is a specification.

I have found that the therapeutically active silver glycocholate can be obtained in a soluble form by causing a solution of hexamethylenetetramin to act upon silver glycocholate and preparing, if required, a solid product for instance by evaporation at a low temperature. The product thus obtained is a colorless or only slightly-colored powder, readily soluble in water, in hot alcohol of 90 per cent. strength and in methyl alcohol, almost insoluble in ligroin; when treating an aqueous solution of the product with hydrochloric acid hexamethylene-tetramin is separated as a hydrochlorid with simultaneous formation of a precipitate of silver chlorid mixed with difficultly-soluble glycocholic acid. The new product is of an excellent therapeutic efficiency in the treatment of gonorrheal diseases. It offers, apart from its useful property of rendering the silver glycocholate soluble in water, the further advantage that it contains the therapeutically active hexamethylenetetramin.

The following examples illustrate my invention, the parts being by weight:

Example I: 100 parts of silver glycocholate are introduced by portions, while stirring or shaking, into a concentrated aqueous solution containing 196 parts of hexamethylenetetramin, whereupon the silver salt becomes dissolved. The solution thus obtained is carefully evaporated preferably in a vacuum at a low temperature and, if possible, in the dark. The hexamethylene-silver glycocholate left is readily soluble in water, in hot alcohol of 90 per cent. strength and in methyl alcohol, almost insoluble in ligroin. The product contains 6.3 per cent. of Ag. The proportions of the silver glycocholate and the hexamethylenetetramin need not be exactly the same as those above indicated in order to obtain a product which is soluble in water.

Example II: 20 parts of glycocholic acid are dissolved in about 400 parts of spirit and then is added in the dark by portions, while stirring and gently heating, a quantity of moist silver oxid corresponding to a little more than 4.7 parts of silver, whereby the silver oxid is gradually converted. The excess of silver oxid is filtered off, to the solution are then added in small portions, also in the dark while stirring, 39.2 parts of hexamethylenetetramin and the resulting solution, if required after having been treated with animal charcoal, is evaporated to dryness at a low temperature and in the dark. A much smaller quantity of spirit than above indicated, indeed only about half of the aforementioned quantity, is required if already during the introduction of the silver oxid there is also added by portions hexamethylene-tetramin, starting with about half of the required total quantity of it, the remaining quantity being added to the warm filtered solution; otherwise the operation is carried out as above indicated.

Having now described my invention, what I claim is:

1. The process of preparing a compound of silver glycocholate readily soluble in water, which consists in causing a solution of hexamethylenetetramin to act upon silver glycocholate.

2. As a new article of manufacture, the hexamethylenetetramin-silver glycocholate, being a colorless to slightly-colored powder which is readily soluble in water, in hot alcohol of 90 per cent. strength and in methyl alcohol, almost insoluble in ligroin; its aqueous solution, when treated with hydrochloric acid, separating hexamethylenetetramin as a hydrochlorid with simultaneous formation of a precipitate of silver chlorid mixed with difficultly-soluble glycocholic acid.

In testimony whereof I affix my signature in presence of two witnesses.

KARL KAUTZSCH.

Witnesses:
JEAN GRUND,
CARL GRUND.